Patented July 11, 1939

2,165,380

UNITED STATES PATENT OFFICE 2,165,380

REACTION PRODUCTS OF A META-SUBSTITUTED PHENOL AND FORMALDEHYDE

Herbert Hönel, Vienna, Austria, assignor to Helmuth Reichhold, Detroit, Mich., doing business as Reichhold Chemicals No Drawing. Application August 1, 1936, Serial No. 93,921. In Austria August 1, 1935

2 Claims. (Cl. 260—51)

My present invention relates to the production of homogeneous reaction masses from low molecular resols and high molecular substances as well as to resols of a definite type which are novel per se.

An object of my invention consists in producing highly reactive, quickly hardenable resols which are yet capable of being chemically combined with the most various substances.

Another object of my invention consists in forming homogeneous reaction masses from particular resols and the most various substances. The latter may either be employed as modifying, more particularly plasticizing agents, heat hardening products plasticized to any desired extent being thus obtainable; or they may be employed in such multiple proportions that permanently soluble reaction products are obtained which are distinguished by a substantially higher viscosity, hardness and melting point respectively, and resistance to physical and chemical influences.

A further object of my invention consists in utilizing the reaction masses in a soluble stage as basic materials for molded articles or turnable masses, varnishes, binding media, etc., such as will be set forth more particularly hereinafter.

It is known that low molecular resols, i. e., phenol-alcohols or -polyalcohols may form homogeneous reaction masses with a multiple quantity of recent resin acids on heating.

Other high molecular carboxylic acids, such as the fatty acids of natural fatty glycerids, however, do not, as a rule, form homogeneous reaction masses when heated with resols, but sagolike to lumpy unmeltable resinous masses separate out in the melt. In order to effect combination of such fatty acids with resols it has been proposed to employ resols which are slowly hardenable per se (such as p-cresol dialcohol) or to substantially reduce the hardening capacity of the resol (phenolpolyalcohol) by certain chemical actions. When jointly heating such resols or modified resols with high molecular fatty acids esterification of alcoholic hydroxy groups and carboxyl groups take place.

Furthermore it is known that homogeneous reaction masses also are formed on heating from neutral resins and other neutral basic materials serving for the production of varnish and the like, such as fatty oils, waxes and various other ester-like bodies, on the one hand and resols on the other, provided the resols (crystalline, liquid, viscous or already resinous solid) derive from phenols which have but two particularly reactive positions in the molecule unoccupied. When working up drying oils or waxes, as a rule, a substituent having several saturated carbon atoms must be present in the phenolic body, said substituent causing the mutual compatibility of the reaction components. The term "particularly reactive position" is intended to mean the o- and p-positions to the phenolic hydroxy group or groups. Thus in a monovalent, mononuclear phenol one of these three positions must be occupied.

The resinifying condensation reaction of phenol (having three particularly reactive positions) with formaldehyde (or its polymers), as is known, proceeds much faster than that of o- or p-cresol (having two particularly reactive positions) with formaldehyde, otherwise analogous conditions provided.

Actually it is not possible jointly to heat resols (phenol/poly/alcohols) deriving from phenol with neutral substances or with fatty acids of natural oils or the like without the formation of absolutely inhomogeneous masses even if the quantity of formaldehyde has been reduced to the minimum quantity necessary for the formation of hardenable products.

The reaction velocity of the phenol being considerably higher than that of the o- or p-cresol, as is known, is surpassed to a multiple extent by that of the m-cresol, the reaction velocity of the symm. m-xylenol in turn being to a multiple extent higher than that of the m-cresol. The reaction velocity of the m-xylenol is so high that it is often difficult to isolate a precautiously prepared phenolpolyalcohol. E. g., traces of a strong mineral acid may lead to an immediate resinification into an unmeltable mass.

Thus the great influence of methyl groups in m-position on the reactivity of the phenol is obvious. Even the combination of a m-cresol polyalcohol with a recent natural resin acid causes difficulties; a combination with fatty acids derived from natural glycerids or even with neutral substances is quite impossible.

It is therefore extremely surprising that, as I have now found, phenol alcohols deriving from the still more reactive symm. m-xylenol are capable of forming homogeneous reaction masses not only with recent resin acids but also with acids derived from fatty oils, e. g., drying oils, or with similar high molecular carboxylic acids, such as naphthenic acids. Thus it appears that, due to the presence of a second methyl group in m-position, on the one hand the resinification velocity is considerably increased whereas on the other hand the capability of being chemically combined with other substances is nevertheless increased, homogeneous reaction masses being formed thereby. In contradistinction to the known process mentioned above no esterification (indicated by the decrease of the acid number) takes place in the course of the reaction between the aforesaid phenolalcohol and acids of fatty oils or the like.

Furthermore I have found by systematic experiments that resols deriving from phenols having larger substituents in m-positions, are capable of being chemically combined also with other substances mentioned hereinbefore such as neutral resins and fatty oils. It is sufficient if only one of the m-positions carries a larger substituent, the other may be unoccupied. Due to the introduction of larger groups, however, the resinification velocity decreases more and more as compared with that of the symm. m-xylenol or its phenolalcohols but first still surpasses, e. g., that of phenol.

This experience may be utilised very advantageously in manifold ways. The possibility of adding plasticizing agents, as is known, plays an important role, e. g., in the production of plastic heat-hardening masses. While, however, resols from phenol or cresol mixtures only allow the addition of very small proportions of oily fatty acids, castor oil or physically similar substances, larger proportions being exuded during the hardening process, according to my present invention resols equal or even superior as to the hardening capacity may be modified by the incorporation of the hereinbefore mentioned substances in any proportion desired, even, e. g., with drying oils. Particularly when employing the last mentioned substances products are obtained which are also excellently adapted for being used as basic materials for heat hardening varnishes and the like. The hardening takes place at relatively low temperatures. The hardened films show an exceedingly high elasticity and an extraordinary resistance against water and chemical agents and possess a very good adhesiveness. A further advantage of the resols employed according to my invention consists also in their generally good light fastness which, as is known, in the case of condensation products obtained from common phenol is very defective.

Permanently soluble reaction masses are obtained only when employing very large proportions of resin acids, acids derived from fatty glycerids, neutral resins, oils, etc. The technical properties of these substances are substantially improved by this process. These reaction masses may advantageously serve as basic materials for varnishes and the like. A permanently soluble reaction mass obtained from a carboxylic acid and a resol should be suitably neutralized, e. g., by the esterification with an alcohol prior to its further utilization.

The term "compatibility" of a resol with other substances as mentioned above, which term I will use hereinafter for the sake of abbreviation, is intended to indicate the capability of being chemically combined with said substances, homogeneous masses being formed thereby. The type of phenols from which the resols according to my invention are obtained is represented by the formula

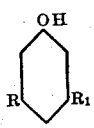

in which R means a substituent while R' means either hydrogen or a substituent. About the following rule may be established:

(1) A total of two C-atoms in R and R' suffices to bring about compatibility with recent resin acids or acids derived from fatty glycerids or other high molecular carboxylic acids.

(2) A total of three to four C-atoms of aliphatic or alicyclic nature suffices to bring about compatibility with substantially neutral high molecular substances (α) of aliphatic nature being rich in oxygen, e. g., glycerides of oxy-acids, (β) of aromatic, hydroaromatic or mixed aliphatic-aromatic nature (such as colophony-glycerol ester, coumarone resins, phthalic acid resins).

(3) In individual cases four of such C-atoms also suffice to bring about compatibility with neutral high molecular substances of distinct aliphatic nature, such as drying oils, waxes, pitches (e. g., residues of petroleum and of the distillation of fatty acids), rubber and similar substances; the presence of five or more of such C-atoms in any case causes the compatibility with the said group of substances.

The greater this number of C-atoms, the more manifold is in general the compatibility of the resol.

The above mentioned rule principally applies to the maximal hardening capacity, viz., that the phenolic body is combined with the maximum quantity of formaldehyde. The preliminary condition, however, is that the molecular size (condensation stage) of the resol is rather low. An increase of the molecular weight, as a rule, considerably impairs its compatibility, so to speak pushes it to a lower range of compatibility. Decrease of the proportion of combined formaldehyde, however, as a rule, pushes it in a higher range. The rule also applies to a mixture of phenols of the above described type.

The substituents R and R' are not limited to saturated hydrocarbon radicals. They may, e. g., contain olefinic double linkages or, e. g., hydroxy or other oxygen containing groups; the hydrocarbon radicals may also be combined with the benzene nucleus only indirectly, e. g., by oxygen or sulfur. Thus $-C_nH_{2n+1}$, $-C_nH_{2n-1}$, $-C_nH_{2n}OH$, $-CO.C_nH_{2n+1}$, $-O.C_nH_{2n+1}$, $-S.C_nH_{2n+1}$, etc., are examples for the substituents.

The resols may be prepared according to any known method, using formaldehyde or other methylene containing agents. I however prefer methods which on the one hand allow the production of low molecular condensation products, and on the other hand enable the combining of as large proportions of formaldehyde as possible.

When using strong alkaline catalysts and low reaction temperatures 2½ to 3 mols formaldehyde, as a rule, may be compounded by the phenols employed according to my invention. Of course, I also may employ a considerably larger quantity of formaldehyde whereby the time necessary for combining the above mentioned maximum proportions is shortened (law of mass action).

It is important that alkaline catalysts such as sodium-, potassium- or barium hydroxide be carefully eliminated from the resol prior to its chemical combination with other substances, since on the one hand they generally increase the resinification velocity in an undesired way, and on the other hand lead to disturbing secondary reactions. Weak catalysts such as ammonium and hexamethylenetetramine respectively may remain in the condensation product.

In particular cases I add strong acids in catalytical proportions to the combination product of the resol and the other substance before carrying to completion the condensation in order to accelerate it.

I may further influence the properties of the resols in that in conjunction with the phenols used according to my present invention I also subject other phenols to the condensation with formaldehyde. The co-use of phenols having but two particularly reactive positions in the molecule unoccupied is of particular importance. Even small proportions of such phenols may often considerably improve the compatibility of the resols with a certain group of substances mentioned above. Instead of starting from such a mixture of phenols I may also combine the separately formed resols whereupon I interact this mixture with the other substance.

The following examples are intended to more clearly illustrate the process:

Example 1

10 parts of symm. m-xylenol, 30 parts of formaldehyde (40% vol.) and 1 part of sodium hydroxide are combined under cooling. The clear solution is left for two to three days at room temperature and is than shaken in the presence of benzene and alcohol with a quantity of hydrochloric acid equivalent to the alkali and with some acetic acid. The watery layer which still contains formaldehyde employed in excess is separated from the benzene-alcoholic solution of the condensation product in a suitable way.

10 to 15 parts of a mixture of fatty acids obtained from linseed oil or another drying oil are carefully heated to about 110–120° C. and the solution of the condensation product is gradually introduced at constant temperature, whereby the solvents escape. The heating is continued until a resinous mass is obtained which at ordinary temperature is free of tackiness. It is readily soluble in various solvents, e. g., in aromatic hydrocarbons. With the application of heat and pressure the mass is converted into an extraordinarily elastic unmeltable product.

The not yet hardened mass is particularly adapted as a base for stove drying varnishes, enamels, cements, adhesives and the like. On heating the thin film coat besides the hardening due to condensation also a hardening caused by oxydation and polymerisation of the fatty acid used takes place so that the films acquire an extreme hardness and yet a high elasticity. The oxydation processes may be accelerated by the addition of a dryer.

Example 2

The solution of the condensation product obtained according to Example 1 is combined with 100 parts of ricininic acid (acid number 195) at about 120° C. The temperature is then gradually raised up to about 200° C. whereby the condensation reaction is carried to completion. The reaction mass (111 parts) is of thickly liquid appearance and has an acid number of 175. This proves that no esterification of the ricininic acid has taken place. The reaction mass is then esterified with 11 to 12 parts of glycerol at 200–250° C. The esterification product which is soluble, e. g., in white spirit constitutes a viscous mass which after thinning and after the addition of dryers yields an excellent, air drying, varnish being highly resistant particularly against diluted alkalies.

Example 3

The phenolic body employed according to the Examples 1 and 2 is substituted by m-ethyl phenol or 1-hydroxy-3-ethoxy-benzene. When proceeding in analogous ways very similar results are obtained.

Example 4

(3) oxo-propyl phenol,

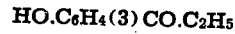

(M. P. 76–77° C.) is condensed for several days at room temperature with a multiple quantity of formaldehyde with the aid of a strong alkali whereupon the catalyst is carefully eliminated. The condensation product obtained is capable of chemically being combined not only with resin acids or fatty acids and the like but also with various neutral resins such as colophony-glycerol ester as well as with castor oil in any proportion, clear reaction masses being formed thereby.

In order to obtain, e. g., a hardenable plastic mass the condensation product is carefully heated to about 100–120° C. with half of its weight of castor oil until a desired consistency is attained. On heating for a prolonged period suitably at higher temperatures with the application of pressure a very elastic plastic mass is formed.

In order to obtain a heat hardenable varnish and the like it is in a similar way combined, e. g., with 1 to 3 parts of a viscous resin (mixed ester) obtained from the interaction of phthalic acid, linseed oil fatty acid and glycerol.

In order to obtain a high melting, oil soluble copal substitute it is heated, e. g., with 5 to 10 times the quantity of colophony-glycerol ester to temperatures above 200° C.

Example 5

(3) α hydroxy-propyl phenol,

(M. P. 108–110° C.) is stirred or shaken with twice the quantity of formaldehyde, 40% vol., and a smaller quantity of barium hydroxide until all has gone into solution apart from a slight turbidity caused by barium carbonate. After about two weeks the barium hydroxide is converted into the carbonate by passing through the charge a current of carbon dioxide, which is removed in a suitable way. The condensation product is so readily soluble in water that it cannot be separated even by the addition of salt. The watery solution is concentrated in vacuo to about twice the weight of phenolic body employed.

When introducing the concentrated watery solution into heated castor oil entirely homogeneous reaction masses are obtained. The same applies for various neutral resins. The condensation product may be utilized and worked up respectively in a similar way as the condensation product in Example 4.

Example 6

1 mol (150 grms.) of (3,5) diethyl-phenol is condensed with about 250 grms. or more of formaldehyde (40% by vol.) as in Example 4.

The viscous condensation product yields homogeneous reaction masses on melting together with resin esters, phthalic acid resins or castor oil. These are insoluble and soluble respectively according to the proportions used. Thus hardenable masses of any desired plasticity or heat hardenable varnishes and the like may be obtained from the condensation product. Or it is heated with larger quantities of cheap resins in order to increase their hardness and melting point.

By melting it together with 1000 grms. of resin ester (M. P. 68-75° C.) a very hard and highly viscous resin melting between 120-135° C. is obtained. This resin is readily soluble in drying oils. Oil varnishes prepared therefrom dry without showing yellowing phenomena.

*Example 7*

(3)-methyl-(5)-isopropyl phenol (M. P. 48-49° C.) is condensed as in the preceding example.

The thickly liquid condensation product may not only be combined by heating with substances mentioned in Example 6, but also with drying oils. There is at most formed a very slight turbidity. The condensation product therefore may be utilized in the most manifold ways.

An excellent heat-hardenable varnish may be obtained, e. g., by carefully melting together the condensation product with 200-300 grms. of China-wood oil at about 130° C., until an only slightly tacky mass is formed. It is soluble, e. g., in white spirit. The mass becomes extremely hard when heated in thin layers (varnish film) for about 1 hour at 150° C., since on heating not only condensation but also oxidation and polymerization take place.

The condensation product is compatible inter alia also with natural or artificial rubber. The condensation product freed from water is kneaded together with, e. g., 2 kg. of crepe rubber on a calender or the like, vulcanizing agents, plasticizing agents and filling materials being added if desired, until a smooth mass of homogeneous appearance is formed. By heating it in a way usually employed for working up rubber, a product is obtained which distinguishes by a much higher tensile strength and less swelling as compared with a product which is obtained from the same starting materials without, however, employing the condensation product.

Almost the same results are obtained when the pure phenolic bodies mentioned above are substituted by a technical product which is contaminated by small portions of homologues which have but two particularly reactive positions unoccupied. It is for example a consequence of this admixture that the resol obtained yields entirely clear reaction products with drying oils; this applies also to the employment of such large proportions of oil that a permanently soluble reaction product is formed also when carrying the reaction to completion. Such reaction products yield extremely resistant varnish films after suitable addition of dryers.

*Example 8*

If the phenolic body employed in Example 6 is substituted by the isomeric m-butyl phenol or by 3-butyloxyphenol (HO.C₆H₄.(3)OC₄H₉, i. e., the monobutyl ether of the resorcinol) condensation products are obtained the properties of which are very similar to those of the condensation product obtained according to Example 6. The products may be brought into reaction, e. g., with castor oil or certain resins, homogeneous masses being formed thereby, but not with excess quantities of drying oils. A smaller proportion of a drying oil, e. g., 100 grms. of linseed oil, may, however, be combined with the condensation product by carefully heating (about at 100° C.). A clear, extremely hard film is obtained if a thin coat (varnish film) of the combination product is exposed to an increased temperature.

*Example 9*

(3) α-hydroxyamylphenol (HO.C₆H₄,(3)CH(OH).C₄H₉)

is condensed with twice the quantity of aqueous formaldehyde (40% vol.) with the aid of a strong alkali for about one to two weeks at room temperature.

The reaction mixture is neutralized and a quantity of common salt sufficient for saturation is added in order to isolate the condensation product. The reaction mixture is then heated on the water bath until turbidity occurs. This is caused by portions of the condensation product which have been converted into higher molecular stages. Benzene and some propyl alcohol are added and the reaction mixture is shaken. The said portions of the condensation product are taken up by the solvents whereby the watery layer is cleared again. The heating and shaking is continued until no further turbidity occurs in the watery layer. The solution of the condensation product is then separated from the watery layer.

The resol obtained in this way yields homogenous reaction masses with drying oils, pitches, rubber, etc., the condensation product may be utilized in most various ways, e. g., as in Example 7.

Essentially similar results are obtained if the phenolic body is condensed with formaldehyde in a way as described in Example 5, whereby a condensation product of as low as possible molecular stage is obtained. The condensation product may be utilized in an analogous way.

*Example 10*

A resol obtained from (3)-isoamyloxyphenol

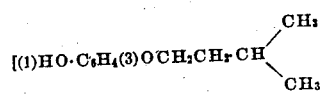

(boiling point 157-160° C. at 12 mms.)] shows a very similar behaviour. The resol is produced, e. g., in a way as described in Example 6.

The resol may be technically utilized, e. g., in the way described in Example 7 very similar results being obtained.

If the production of a reaction product (varnish basic material) with a drying oil, e. g., linseed oil, is aimed at which is soluble also after the condensation reaction is carried to completion at least eight times the quantity as compared with the weight of phenolic body is to be employed since otherwise gelatinization of the reaction mixture occurs.

When 10 parts of a rosin glycerol ester are melted together with such a quantity of the condensation product as corresponds with 1 part of the phenol used, a resin is formed the softening point of which is 35° C. higher than that of the rosin ester used. These data show that the resol is considerably superior to one which derives from a phenol of about the same molecular size, having, however, but two particularly reactive positions unoccupied.

*Example 11*

Very similar results as in the Examples 7, 9 or 10 may be obtained if, e. g., the following phenolic bodies are used.

I. Tert. butyl 3-hydroxyphenylcarbinol

[(3) HO.C$_6$H$_4$.CH(OH).C.(CH$_3$)$_3$]

II. 3-oxo - hexylphenol (=amyl - 3 - hydroxyphenyl ketone HO.C$_6$H$_4$.(3) CO.C$_5$H$_{11}$)

III. Hexyl-(3) hydroxyphenyl-carbinol (=3 hydroxyheptyl-phenol)

HO.C$_6$H$_4$.(3) CH(OH).C$_6$H$_{13}$

IV. Cyclohexyl-3-hydroxyphenylcarbinol (=HO.C$_6$H$_4$.(3) CH(OH).C$_6$H$_{11}$)

V. (3) α-heptenylphenol (HO.C$_6$H$_4$.(3) CH=CH.C$_5$H$_{11}$)

VI. Decyl-3-hydroxyphenyl-carbinol [(3) α-hydroxy-undecylphenol]

HO.C$_6$H$_4$. (3) CH(OH).C$_{10}$H$_{21}$

VII. 1-hydroxy-3-bornyloxybenzene

[(1) HO.C$_6$H$_4$.(3) C$_{10}$H$_{17}$= resorcinol monobornyl ether].

The condensation products (resols) are prepared, e. g., according to the methods described in the Examples 5, 6 or 9. If higher temperatures are avoided as far as possible sufficiently low molecular resols are obtained which are compatible with all classes of substances mentioned in the description.

Example 12

In contradistinction to resols which derive from phenols having but two particularly reactive positions unoccupied the general compatibility of the resols which derive from the phenols used according to my present invention, depends to a very large extent upon the molecular size (condensation stage) of the resols (compare the description above). This is illustrated, e. g., by the following experiment:

The phenols:
(a) As used in Example 9,
(b) III in Example 11,
(c) VI in Example 11, which are homologues in the narrowest sense, are each condensed with a multiple proportion of aqueous formaldehyde in the presence of sodium hydroxide or the like at 40° C. for about four to five days. On neutralizing the charges very viscous or solid resinous, water insoluble condensation products are obtained.

While when proceeding in a manner as described in Examples 9 or 5 very low molecular resols are obtained all of which are capable of chemically being combined ("Compatible") with drying oils and other neutral substances belonging to the same "class", the compatibility of the resols obtained according to the present example is substantially reduced. The resol obtained from (a) is neither compatible with drying oils nor with castor oil but only with acidic substances such as resin acids or acids derived from fatty glycerids; that obtained from (b) is compatible, e. g., with castor oil and other substances of that class but incompatible with drying oils, etc. Only the condensation product obtained from the phenol (c) which carries a particularly large substituent is compatible also with drying oils and other neutral substances of distinct aliphatic nature, e. g., rubber.

In the preceding examples special reference has been made to resols and their utilization, which are prepared with the aid of a strong alkaline catalyst, the latter being removed after condensation between the phenol and formaldehyde has been performed The generally employed aqueous formaldehyde, partly at least, may be replaced by its anhydrous polymeric forms. The catalyst may be replaced, e. g., by strong organic bases, such as methylamine. Also when using weak alkalies, such as ammonia, good results may be obtained. In the latter case the neutralization of the catalyst may be omitted. The formaldehyde may be replaced not only by its polymers but also by another methylene containing agent, such as hexamethylenetetramine, similar results being obtained thereby as from formaldehyde and ammonia.

Apart from those substances which have been mentioned in the preceding specification and examples for chemically being combined with the resols, many other more or less closely related substances may be employed, whereby the character of the final product may be still more varied. Apart from the nature of these substances the character of the final product depends to a very large extent also upon the relative proportions of these substances and the resol, finally, however, also upon the further chemical or physical treatment of the combination product.

Instead of acids derived from fatty glycerids, ("class 1"), there may, e. g., be employed: saturated high molecular fatty acids, acids derived from waxes, natural resin acids or mixtures thereof with acids derived from fatty oils, artificially obtained masses which contain many free carboxylic groups, such as a still acid reaction product obtained from polyvalent alcohols, polybasic and monobasic carboxylic acids or their natural glycerides (an example for such a product being

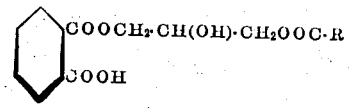

wherein R means a saturated or unsaturated radical).

The term "high molecular substances carrying carboxylic groups" as used herein means the hereinbefore mentioned substances of high molecular weight which contain carboxylic groups and their obvious chemical equivalents.

Instead of castor oil, colophony glycerol ester, coumarone resin, ("class 2"), there may, e. g., be employed blown fatty oils (e. g., blown linseed oil) or partial glycerol esters of higher fatty acids, more particularly a monoglyceride, or liquid abietic esters, or natural resins being per se neutral (such as dammar, maiti resin), or neutral artificial resins obtained by condensation or polymerisation or both, such as phenolic resins (novolaks) polymerized aromatic hydrocarbons (e. g., indene, styrol), polymerized products of ester-like nature (such as vinyl- or acryl compounds); also urea-formaldehyde resins and other aminealdehyde resins are compatible, more particularly with hydrophile resols such as mentioned above. In individual cases such resins as mentioned hereinbefore suitably are combined with the resol in a dissolved stage.

The term "substantially neutral high molecular substances (α) of aliphatic nature being rich in oxygen, (β) of aromatic, hydroaromatic, mixed aliphatic-aromatic nature" as used herein, means the hereinbefore mentioned substantially neutral substances of high molecular weight of (a) aliphatic, nature which are rich in oxygen or (b) aromatic, hydroaromatic or mixed aliphatic-aromatic nature and their obvious chemical equivalents.

Instead of drying oils, pitchy residues of aliphatic nature, waxes ("class 3"), e. g., stand oils, asphalts, bitumens; tallows, mineralic waxes; reclaimed rubber and other depolymerization products of rubber, gutta percha, overpolymerized oils, factice may be combined with the resols in an appropriate way.

The term "neutral high molecular substances of aliphatic nature" as used herein means the hereinbefore mentioned substances of high molecular weight and aliphatic nature and their obvious chemical equivalents.

The combination products may be utilized in the most various ways. Products obtained by incomplete condensation, which by complete condensation become insoluble and infusible, i. e., which are heat hardening, may be hardened in molds with or without the addition of filling materials, products adapted for the most various uses being obtained. A further use consists, e. g., in the manufacture of floor and wall coverings and the like. The solution of such a hardenable product may not only serve as heat hardening varnish or for enamels, cements (i. e., for common coatings known in the varnish field) but also as adhesives or binding agents (e. g., for water resistant abrasives), impregnating agents for wood, paper textiles and other porous materials. Instead of the solution there may also be employed the product itself liquified by heat for the purposes mentioned.

But also permanently soluble end products obtained by complete condensation may serve for the said purposes at least when containing drying oils or the radicals thereof. Permanently soluble end products without drying properties may also serve as basic materials for varnishes and lacquers (e. g., as plasticizing agents) if they are compatible with nitrocellulose, cellulose ethers, chlorinated rubber and similar film forming materials. The compatibility of an end product with nitrocellulose generally is brought about by a relatively large number of esterlike groups.

What I claim is:

1. A resol obtained from a methylene containing agent and a phenol having all particularly reactive positions (o-, o-, p- to the phenolic hydroxy group) unoccupied but at least one of the meta-positions occupied by a saturated substituent of aliphatic nature containing more than two carbon atoms capable of reaction with (1) high molecular substances carrying carboxylic groups, (2) substantially neutral high molecular substances ($\alpha$) of aliphatic nature being rich in oxygen, ($\beta$) of aromatic, hydroaromatic, mixed aliphatic-aromatic nature, and (3) neutral high molecular substances of aliphatic nature, to produce homogeneous reaction products.

2. A resol as set forth in claim 1, wherein the substituent contains at least 4–5 carbon atoms.

HERBERT HÖNEL.